United States Patent [19]

Zarembka

[11] 4,187,932
[45] Feb. 12, 1980

[54] RIBBON-WRAPPED CARBON BRAKE DISK

[75] Inventor: Robert L. Zarembka, Akron, Ohio

[73] Assignee: Goodyear Aerospace Corporation, Akron, Ohio

[21] Appl. No.: 874,182

[22] Filed: Feb. 1, 1978

[51] Int. Cl.² ............................................. F16D 65/12
[52] U.S. Cl. ............................... 188/73.2; 156/185; 188/251 M; 192/107 M; 242/6; 428/65; 428/408
[58] Field of Search .................. 188/73.2, 251 A; 192/107 M; 242/6; 156/185, 186, 191, 195; 428/65, 408

[56] References Cited

U.S. PATENT DOCUMENTS

| | | | |
|---|---|---|---|
| 2,335,902 | 12/1943 | Ball et al. | 428/65 X |
| 3,552,533 | 1/1971 | Nitz et al. | 192/107 M |
| 3,692,150 | 9/1972 | Ruppe, Jr. | 188/251 A X |
| 3,731,769 | 5/1973 | Ely | 188/251 A X |
| 3,936,552 | 2/1976 | Krupp et al. | 188/251 A X |
| 3,956,548 | 5/1976 | Kovac et al. | 188/251 A X |
| 4,002,225 | 1/1977 | Marin | 188/251 A X |
| 4,005,233 | 1/1977 | Dritt et al. | 156/186 X |

FOREIGN PATENT DOCUMENTS 567030  1/1945  United Kingdom ........................ 242/6

*Primary Examiner*—George E. A. Halvosa
*Attorney, Agent, or Firm*—P. E. Milliken; E. W. Oldham; D. J. Hudak

[57] ABSTRACT

The invention relates to the utilization of a pyrolyzed carbon-containing ribbon which is wrapped about a brake disk core. The ribbon which is impregnated with a bonding agent forms an outer layer when wrapped about the core. An integral brake disk is formed upon pyrolyzation of the bonding compound.

12 Claims, 12 Drawing Figures

RIBBON-WRAPPED CARBON BRAKE DISK

BACKGROUND OF THE INVENTION

The present invention relates to a carbon-containing ribbon wrapped about a carbon brake disk core to form an outer layer. The ribbon, which contains a bonding agent either through preimpregnation or through the application of a bonding compound after the wrapping, is pyrolyzed so that an integral brake disk is formed.

Heretofore, carbon brake disks have been made of carbon or graphite-based materials. However, all such brake disk constructions had generally utilized some type of reinforcement, invariably carbon filaments in some fabric form such as cloth, woven material, etc. Usually, the brake disk was made by cutting the fabric in the form of an annulus, forming a stack by piling a plurality of said annulus on the top of the preceding annulus, impregnating the stack with a bonding agent according to any conventional method, and pyrolyzing the stack to produce a carbon brake disk. Usually, the impregnation step was repeated a number of times until all of the pores within the stack were generally filled or until a desired density was obtained, as set forth in U.S. Pat. No. 3,794,509. Although a relatively good brake disk was produced, this method was time consuming and costly.

Another somewhat similar method is set forth in U.S. Pat. No. 3,730,320 to Freeder et al. In this patent, segments of an annular carbon cloth having an arc of from about 45 degrees to about 180 degrees were continually overlapped until a completed annulus or an arc of 360 degrees was formed. The annulus was then impregnated with a bonding agent and pyrolyzed to form a brake disk. Thus, a brake disk produced according to this patent had the same drawbacks as set forth immediately above and additionally required accurate overlapping of the various segmented cloths to achieve a relatively even distribution of weight as well as a constant disk thickness. In practice, the latter two aspects were often very difficult to achieve.

In order to reduce the time required for producing a carbon brake disk, Kovac et al, U.S. Pat. No. 3,956,548, constructed a thin or less-than-full width carbon core and applied wear disk layers to each side thereof via a carbon felt layer saturated with an adhesive. Naturally, upon pyrolyzation of the adhesive, an integral brake disk was formed. Although this construction reduced fabrication time, it still required substantial lamination of the various carbon cloth layers.

In U.S. Pat. No. 3,712,421 to Cook et al, a refurbishment technique is shown wherein once an existing carbon brake disk has been worn, it is ground down to a specific size, and previously laminated wear layers added either to one side or the other, or both.

SUMMARY OF THE INVENTION

It is an object of the present invention to provide a carbon brake disk wherein a carbon-containing ribbon is wrapped about a brake disk core.

It is a further object of the present invention to provide a carbon brake disk, as above, wherein said ribbon is generally wrapped about said brake disk in a radial, chordal, diametrical, parallel, etc., direction with an overlapping or a criss-cross pattern.

It is another object of the present invention to provide a carbon brake disk, as above, wherein said core cross-section is tapered.

It is a still further object of the present invention to provide a carbon brake disk, as above, wherein said ribbon is impregnated with a bonding agent so that upon pyrolyzation, an integral brake disk is formed.

It is still another object of the present invention to produce a carbon brake disk, as above, which is readily and inexpensively made.

These and other objects of the present invention will become apparent from the following specification which describes in detail various embodiments without attempting to discuss all of the modifications in which the invention might be embodied.

In general, a brake disk comprises: a core; an outer layer about said core, said outer layer made from a pyrolyzed carbon-containing ribbon wrapped about said core; a bonding compound, said ribbon impregnated with said bonding compound and joining said core and said ribbon outer layer; and said bonding compound in said outer layer having been pyrolyzed to form an integral brake disk.

Additionally, a process for fabricating an integral brake disk, comprises the steps of: fabricating a brake disk core; impregnating said pyrolyzed carbon-containing ribbon with a bonding agent; wrapping said pyrolyzed carbon-containing ribbon about said core to form an outer layer; and pyrolyzing said bonding agent to form an integral brake disk.

DESCRIPTION OF THE PREFERRED EMBODIMENTS

Figure 1:
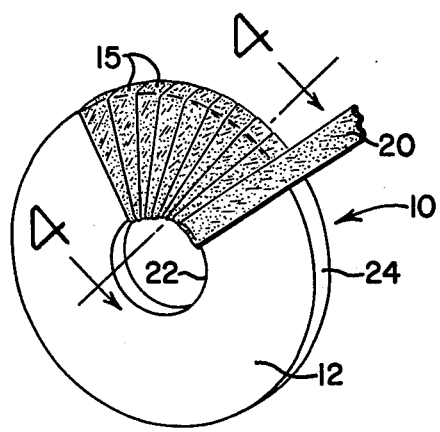
FIG. 1 is a perspective view of a brake disk core having a ribbon wrapped about a core in a radial direction.
Figure 2:
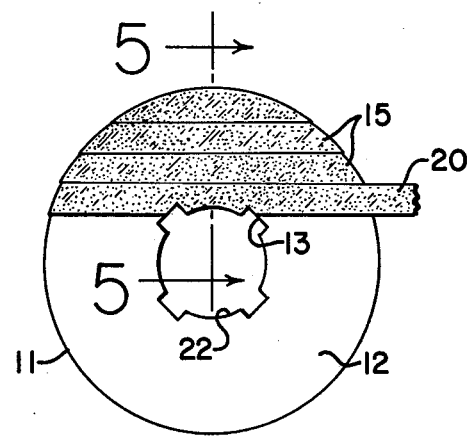
FIG. 2 is a plan view of a brake disk core having a carbon-containing ribbon wrapped about the core in a parallel manner.
Figure 3:
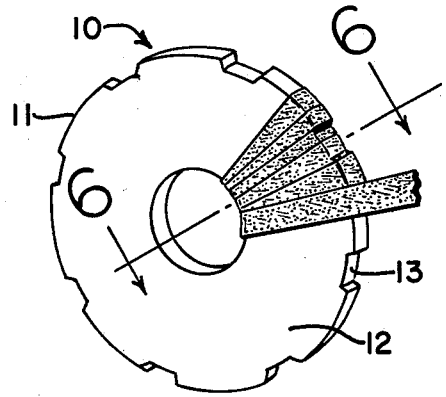
FIG. 3 is a perspective view similar to FIG. 1 wherein the brake disk core has keyway slots and the carbon-containing ribbon is wrapped about the core in a radial manner.

Brake disk core 11, as shown in FIGS. 1 through 11, can be made in any conventional manner using any conventional material. For example, the core may be made from a carbon/carbon composite, a carbon/graphite composite, a graphite/carbon composite, a graphite/graphite composite, bulk carbon, bulk graphite, or the like, including any combination thereof, such as a sandwich-type or multiple-layered brake disk, as well known to those skilled in the art. Core 11 may be segmented (not shown), but preferably is continuous, as shown. Moreover, the core may be solid, that is not have an aperture, as in FIGS. 10 and 11. The cores may or may not contain keyways 13. Thus, the core may be utilized as a rotor brake disk as shown in FIG. 3 or as a stator brake disk as shown in FIG. 2.

According to the concepts of the present invention, the core may or may not possess good physical properties such as tensile strength, resistance to impact loading, or the like, depending upon desired end use. Naturally, the core portion made of a composite lamination-type construction will contain conventional-type carbon fibers, usually in the form of a cloth. Additionally, the cores or core portions made from bulk graphite or bulk carbon can contain solely bulk carbon or bulk graphite or can contain various amounts of fibers which can be pyrolyzed to essentially carbon or graphite. For example, a bulk graphite or bulk carbon core may contain fibers made from polyacrylonitrile, rayon, wool, coal tar pitch, petroleum tar, or any other suitable carbon-containing fabric or filament. Such fibers may be distributed in the core in any conventional manner; for example, at random, or may be in the form of fabric layers wherein the fabric is woven, stapled, or otherwise made. Since fibers may be readily mixed with bulk graphite or bulk carbon along with a bonding compound, molded, and then pyrolyzed in a much shorter period of time and in a more economical manner than that required to construct a composite-type core, the bulk-type core construction is often preferred.

Residing about core 11 is an outer layer 15. Outer layer 15 can be added to an originally manufactured core or, as by way of refurbishment, to a worn carbon brake disk which has been machined to a desired thickness and shape. Outer layer 15 comprises generally a flexible, carbon-containing ribbon 20 which has been wrapped about core 11. By a carbon-containing ribbon, it is meant a ribbon which generally contains a plurality of filaments, fibers, and the like, usually assembled in the form of any particular weave, braid, knit, mat, and the like, which filament, etc., is an organic (carbon-containing) material and has been pyrolyzed to yield essentially carbon or graphite. The filaments or fibers may thus be any type of material which generally contains a high amount of carbon-containing material with specific examples including polyacrylonitrile, rayon such as viscose rayon, wool, coal tar pitch, petroleum pitch, and the like. Generally, the thickness of the ribbon may have any thickness such as from 0.01 to 0.1 inches.

The pyrolyzed ribbon is impregnated with a bonding agent to add further strength as well as to provide a medium in which to bond outer layer 15 to core 11. Impregnation can be accomplished through any conventional method as by coating, dipping, painting, brushing, chemical vapor deposition, and the like. Since the carbon-containing filaments, fabric, etc., upon pyrolyzation, shrink to a substantial extent, it is highly preferred that the pyrolyzation of the ribbon occurs before any application of the ribbon to core 11. Otherwise, due to shrinkage, the ribbon will tend to fracture or break and often fall off the core when pyrolyzed upon the core. Preferably, it is desirable that the pyrolyzed ribbon be preimpregnated with the bonding agent before application to the core. By preimpregnation, it is meant that the pyrolyzation of the bonding agent is carried out to an extent less than completion, such that the ribbon containing the bonding agent is tacky or is capable of supporting and maintaining a fixed and yet flexible shape. Otherwise, the bonding agent and hence the ribbon would be hard and inflexible and thus incapable of application to the core. On the other hand, if no partial pyrolyzation of the bonding agent applied to the ribbon occurred, the bonding agent would tend to run and prevent proper adhesion to each other upon application to the core.

The bonding agent may be any conventional bonding agent which, upon heating, can be pyrolyzed to either carbon or graphite. Representative examples include petroleum pitch, coal tar pitch, furan resins, phenolic resins, as well as the utilization of a carbon vapor deposition method.

Another method of applying the bonding agent to the ribbon and core involves wrapping the core with the ribbon in any manner, placing the ribbon-wrapped core into a mold, and injecting a bonding compound into the mold under high pressure so that it impregnates the ribbon and forms a contact between the core and the ribbon. The ribbon-wrapped core is then heated to pyrolyze the bonding compound. Regardless of the particular method or manner of applying the bonding compound, whether through preimpregnation of the ribbon, through the molding preimpregnation method, or any other method; generally, another impregnation step must be repeated at least once in order to build up a sufficient density since, otherwise, the initial impregnation leaves a porous bonding layer. Preferably, after a bonding agent has been added and pyrolyzed, any desirable and additional number of bonding agent coatings may be added. A preferred method of adding second or subsequent bonding coating layers is through chemical vapor deposition.

In accordance with conventional practice, pyrolyzation requires a temperature of at least 1,000° C. in order to produce essentially a carbon compound of either the material forming the carbon ribbon and/or the bonding agent. Should graphite be desired, a thermal treatment of at least 2,600° C. is required. The amount of time for the carbonization or graphitization operation will, of course, vary with the thickness of the outer ribbon layer as well as the characteristics of the specific bonding agent utilized. However, these elements and factors are well known to those skilled in the art.

Depending upon the desired characteristics of the bonding agent, the impregnated carbon-containing ribbon which forms outer layer 15 may have from fair to exceedingly good physical properties, depending upon the type of method utilized. For example, should the core have poor physical properties, it is often desirable to have outer layer 15 possess good physical properties. On the other hand, should the core have good physical properties, then outer layer 15 need not necessarily have good physical properties, but preferably have good wear properties. In any event, outer layer 15 can possess various good physical properties such as high tensile strength, impact resistance, good compressive strength, high flexural strength, good shear strength, a high purity, high density, a high specific heat, high thermal conductivity, and low thermal expansion.

Figure 8:
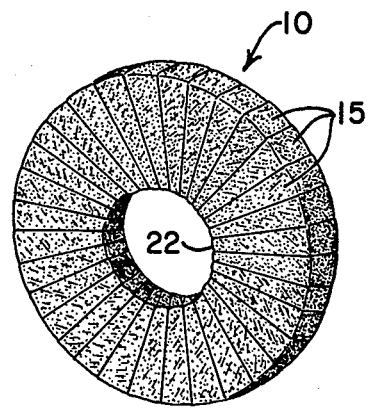
FIG. 8 is a perspective view similar to FIG. 1 wherein the radial wrapping of the carbon-containing ribbon about the core has been completed.

As previously noted, carbon-containing ribbon 20, preferably preimpregnated with a bonding agent, is wrapped about core 11 in any manner, a few best embodiments of which are shown in the drawings. Referring to FIG. 1, carbon-containing ribbon 20 may be wrapped about core 11 in a radial direction. That is, the ribbon may be wrapped such that it is wound from center core aperture 22 to outer periphery or core edge 24 and back to aperture 22 with this procedure repeated until both faces 12 of core 11 are completely covered. This method is preferred, generally due to ease of assembly and short amount of time required. Moreover, as seen in FIG. 1, the ribbon is usually wound to partially overlap as from about 10 percent to about 90 percent of the preceding winding until an arc of at least 360 degrees has been completed, although the ribbon may be wound without any overlapping or successive windings in such a manner so that after several or more windings, each portion of the disk surface area is covered by the same approximate number of windings. Depending upon the thickness of outer layer 15 and the amount of overlap, anywhere from a single 360 degree wrap to several or multiple wraps may be utilized. Moreover, after any completed 360 degree wrap, the radially wrapped ribbon may be wound back upon itself, that is in the opposite direction (counterclockwise or clockwise), so that a criss-cross effect is produced. Generally, a desired final thickness of the wrapped ribbon is approximately 20 percent of the core width per face with a range of from 5 percent to 25 percent per face. Of course, larger or smaller thicknesses may also be utilized. Whenever multiple windings are utilized, the ribbon, of course, need not partially overlap the previous winding so long as, desirably, each portion of core disk face 12 has the same thickness of ribbon as the remaining portions. A completed, radially wound wrapped brake disk 10 is shown in FIG. 8.

Figure 4:
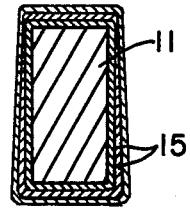
FIG. 4 is a cross-sectional view taken on line 4—4 of FIG. 1.
Figure 5:
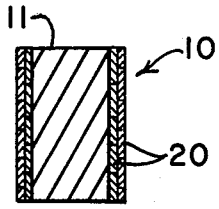
FIG. 5 is a cross-sectional view taken on line 5—5 of FIG. 2.

Another manner of wrapping carbon-containing ribbon 20 about brake disk core 11 is shown in FIG. 2. In this embodiment, ribbon 20 is merely laid across each face of the brake disk core 11 in a parallel direction or manner with the ribbon generally being cut along the outer periphery of the core. As shown in FIG. 4, the ribbon-covered portion of FIG. 2 contains two staggered layers. Once again, any number of layers may be utilized depending upon the desired thickness. Moreover, to impart additional strength to the outer layer, successive or succeeding parallel windings or applications may be laid at any angle to the previous wrapping so that the succeeding layers of ribbon are laid in directions different from the immediately preceding layer.

Regardless of the method of wrapping, the core may or may not have keyway slots 13. That is, the core may be initially wrapped as in FIG. 1 with keyway slots 13 then machined therein or after pyrolyzation of outer layer 15. As shown in FIG. 2, the brake disk has internal or stator keyway slots. As shown in FIG. 3, core 11 has keyway slots 13 therein about the periphery as in a rotor disk. Preferably, when a radially wound method of wrapping is utilized, the ribbon desirably extends through the keyway slots regardless of whether a rotor or stator disk is being wrapped. Since the ribbon generally has good physical properties when pyrolyzed, the forces will be readily transmitted to disk 10 through formed outer layer 15 without any cracking of layer 15. Thus, the necessity of metal clips or the like to transmit the force to or from the disk is often not required.

Figure 6:
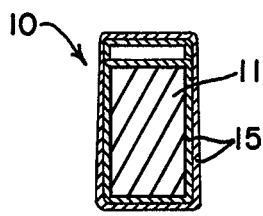
FIG. 6 is a cross-sectional view taken through the keyway slots on line 6—6 of FIG. 3.
Figure 7:
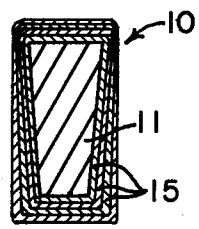
FIG. 7 is a cross-sectional view of a brake disk core wherein the core is tapered so that the completed wrapped core has parallel sides and is not pear-shaped as in FIGS. 4 and 6.

As shown in FIGS. 4 and 6 which are cross-sectional views of FIGS. 1 and 3, respectively, due to the fact that the periphery of the core has a much larger circumference than the circumference of aperture 22, ribbon 20 will overlap itself more often and to a greater extent at the radial inner portion of the disk than at the radial outer portion. Thus, if core 11 is of a constant thickness, ribbon 20, whenever wrapped in a radial manner, will be thicker at the center or aperture portion of the core than at the outer peripheral portion and, hence, depending upon whether the upper or lower core portion is viewed, will be an inverted pear shape. In order to produce a suitable brake disk, this excess thickness of outer layer 15 must be machined after the ribbon is pyrolyzed so that opposing faces 12 are parallel to each other. Whenever a brake disk core 11 is fabricated with various layers of a fabric or cloth, as in a carbon/carbon-type composite construction, etc., the pear-shaped construction is difficult to avoid with radially wrapped windings. However, when the core is made from a bulk-type material such as bulk carbon or bulk graphite, desirably it is molded such that it has an inverted truncated frustum configuration, with the narrowest portion of the frustum occurring at the center aperture 22, as shown in FIG. 7. Thus, since the inner radial portion of core 11 is thinner than the outer peripheral portion, ribbon 20, when applied in a radial-winding procedure, will yield outer faces 12 which are essentially parallel to each other. Of course, it is within the knowledge of one skilled in the art to calculate the taper of the core to yield essentially parallel, radially wrapped faces depending upon the number of ribbon layers, thickness of the ribbon, and the like.

Figure 9:
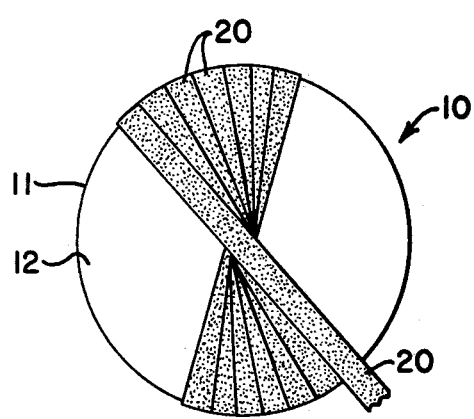
FIG. 9 is a plan view of a solid brake disk, that is a brake disk having no center aperture, wherein a carbon-containing ribbon is wrapped about the core in a diametrical manner.
Figure 10:
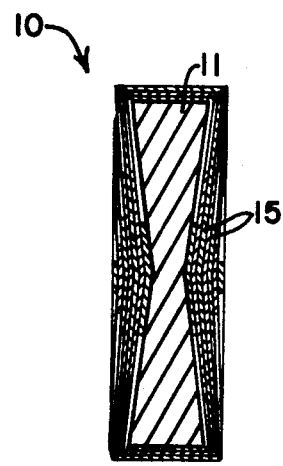
FIG. 10 is a cross-sectional view of a completely wrapped brake disk as wrapped in a manner as shown in FIG. 9.

FIGS. 9 and 10 represent a core having no central aperture. In other words, the core is solid from one periphery to the opposite periphery and is tapered to accommodate the additional winding thickness encountered at the center of the disk. As shown in FIG. 9, a diametrical winding method may be utilized wherein the partial overlapping may vary from 10 percent to about 90 percent. Once again, the amount of the taper may be calculated so that upon a full 360 degree wrap or any multiple wraps thereof, essentially parallel opposing faces are achieved, as shown in FIG. 10.

Figure 11:
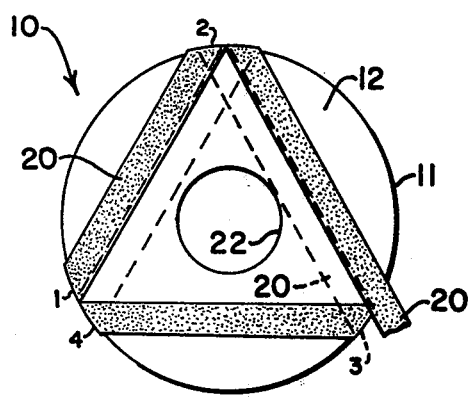
FIG. 11 is a plan view of a brake disk core having a carbon-containing ribbon wrapped about the core in a chordal manner.

In FIG. 11, another embodiment is shown wherein a chordal method or manner is utilized to apply a pyrolyzed carbon ribbon, which may be impregnated with a bonding agent to an annular brake disk core. As shown in FIG. 11, the ribbon containing a bonding agent thereon may be commenced at point one of the brake disk core and wound to point two. From then, it may be wrapped to point three on the other side of the brake disk and then to point four. This process is repeated such that the various windings overlap each other from about 10 percent to about 90 percent until the complete wrapping of the brake disk is achieved.

Figure 12:
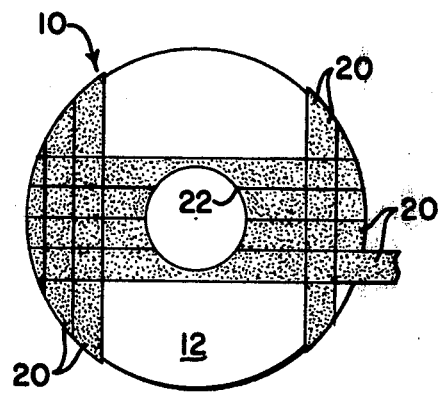
FIG. 12 is a plan view of a brake disk core having a carbon-containing ribbon wrapped about the core in a criss-cross manner.

FIG. 12 represents yet another embodiment in which a brake disk may be wrapped. This method is very similar to FIG. 2 except that alternate windings may be at any angle exactly 90 degrees to the preceding windings such that a criss-cross pattern is achieved.

After outer layer 15 has been applied to the core in any of the preceding manners or in any other manner and pyrolyzed, the ribbon faces are machined until they are parallel to each other. Similarly, if the core originally had keyways, the remaining slots, after pyrolyzation, are machined to any desired taper and depth. Should the disk lack any keyways whatsoever, the keyways may be machined according to any conventional method.

Carbon brake disks according to the present invention are suitable in both conventional and fighter aircraft due to their extreme lightweight, as well as other applications wherever a brake is required. For example, the embodiment of FIGS. 9 and 10 may be utilized in association with alternating steel disks for industrial applications. Other examples of industrial applications, wherein the carbon brake disk of the present invention can be utilized, include various situations for stopping larger items or equipment such as fly wheels, cranes, and the like. Still other examples include use in vehicles such as large earth moving trucks, automobiles, bus and truck brakes, and the like. Additionally, the brakes of the present invention may also be utilized for stopping catapults on aircraft carriers. Of course, the annulus-type brake disk may also be utilized in such industrial applications wherein the various brake disks form a stack and may be held as in a metal frame so that upon actuation of a piston, the various brake disks are pressed against one another and thus produce a braking force. Additionally, the present invention permits worn brake disks to be readily refurbished in that the worn disks need only be machined to a desired thickness, wrapped with ribbon 20 containing a bonding agent, and then pyrolyzed in a manner as described above.

While in accordance with the patent statutes, only the preferred embodiments of the invention have been illustrated and described in detail, it is to be understood that the invention is not limited thereto; the invention being defined by the scope of the attached claims.

What is claimed is:

1. A process for fabricating an annularly strengthened integral brake disk, comprising the steps of:
    fabricating a brake disk core, having core faces;
    impregnating a pyrolyzed carbon-containing ribbon of continuous uniform width with a bonding agent;
    continuously wrapping said pyrolyzed carbon-containing ribbon completely about said core faces of said core in a sequential overlapping manner to form an outer layer; and
    pyrolyzing said bonding agent to form an annularly strengthened integral brake disk.

2. A process according to claim 1, wherein said brake disk core is made from a compound selected from the class consisting of a carbon/carbon composite, a carbon/graphite composite, a graphite/graphite composite, bulk carbon, bulk graphite, and combinations thereof.

3. A process according to claim 2, including wrapping said ribbon about said core in a radial manner.

4. A process according to claim 2, including wrapping said ribbon about said core in a parallel manner.

5. A process according to claim 2, including wrapping said ribbon about said core in a chordal manner.

6. A process according to claim 2, including wrapping said ribbon about said core in a diametrical manner.

7. A process according to claim 2, including wrapping said ribbon about said core in a criss-cross manner.

8. A process according to claim 2, wherein said core is tapered.

9. A process according to claim 2, wherein said bonding agent is selected from the class consisting of petroleum pitch, furan resin, phenolic resin, and coal tar pitch.

10. A process according to claim 9, including making said pyrolyzed carbon-containing ribbon from a fiber, said fiber selected from the class consisting of rayon, polyacrylonitrile, wool, petroleum pitch, and coal tar pitch.

11. A process according to claim 10, wherein said core is tapered.

12. A process according to claim 10, wherein said disk core has an inner periphery and an outer periphery, and wrapping said ribbon completely about said inner and said outer peripheries.

* * * * *